(12) United States Patent
Yoshimura et al.

(10) Patent No.: US 9,796,250 B2
(45) Date of Patent: Oct. 24, 2017

(54) VEHICLE WINDOW REGULATOR, AND VEHICLE DOOR STRUCTURE COMPRISING THE VEHICLE WINDOW REGULATOR

(71) Applicant: HI-LEX CORPORATION, Hyogo (JP)

(72) Inventors: Tatsuo Yoshimura, Takarazuka (JP); Hideya Hosoi, Takarazuka (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 14/368,488

(22) PCT Filed: Dec. 26, 2012

(86) PCT No.: PCT/JP2012/083674
§ 371 (c)(1),
(2) Date: Jun. 24, 2014

(87) PCT Pub. No.: WO2013/099956
PCT Pub. Date: Jul. 4, 2013

(65) Prior Publication Data
US 2014/0346806 A1 Nov. 27, 2014

(30) Foreign Application Priority Data

Dec. 26, 2011 (JP) .................................. 2011-284402
Jun. 1, 2012 (JP) .................................. 2012-126414

(51) Int. Cl.
*B60J 1/17* (2006.01)
*E05F 11/38* (2006.01)
*E05F 11/48* (2006.01)

(52) U.S. Cl.
CPC ............... *B60J 1/17* (2013.01); *E05F 11/382* (2013.01); *E05F 11/486* (2013.01);
(Continued)

(58) Field of Classification Search
CPC ..... E05F 11/382; E05F 11/385; E05F 11/481; E05F 11/483; E05F 11/488; E05F 15/681; E05F 15/686; E05F 15/689
See application file for complete search history.

(56) References Cited

U.S. PATENT DOCUMENTS 4,878,391 A * 11/1989 Komatsu ............... E05F 11/485
49/352
4,970,911 A * 11/1990 Ujihara ................. E05F 11/486
403/361
(Continued)

FOREIGN PATENT DOCUMENTS

JP   H06-042256 A   2/1994
JP   2000-104448 A   4/2000
(Continued)

OTHER PUBLICATIONS

English translation of International Preliminary Report on Patentability (Chapter I PCT).
(Continued)

*Primary Examiner* — Katherine Mitchell
*Assistant Examiner* — Catherine A Kelly
(74) *Attorney, Agent, or Firm* — Global IP Counselors, LLP

(57) ABSTRACT

A window regulator comprises a carrier plate, a drive unit, a raising cable, a lowering cable, and a guide rail. The carrier plate is attached to a lower part on a first edge part side of the windowglass. The drive unit is capable of raising and lowering the windowglass via the carrier plate. The drive unit and the carrier plate are coupled by the raising cable and the lowering cable. The guide rail mates with the carrier plate so as to guide the carrier plate and constrain the operation of the windowglass to directions that intersect movement directions of the carrier plate.

10 Claims, 10 Drawing Sheets

(52) U.S. Cl.
CPC ....... *E05F 11/488* (2013.01); *E05Y 2201/612* (2013.01); *E05Y 2900/50* (2013.01); *E05Y 2900/55* (2013.01)

(56) References Cited

U.S. PATENT DOCUMENTS

| | | | |
|---|---|---|---|
| 5,005,316 A * | 4/1991 | Hornivius | 49/348 |
| 5,262,114 A * | 11/1993 | Boyce et al. | 264/257 |
| 6,052,946 A * | 4/2000 | Isomura | 49/352 |
| 6,061,963 A * | 5/2000 | Osborn et al. | 49/352 |
| 6,115,966 A * | 9/2000 | Shibata | 49/352 |
| 6,301,834 B1 * | 10/2001 | Tyves | 49/441 |
| 6,854,213 B2 * | 2/2005 | Galliani | 49/375 |
| 7,617,633 B2 * | 11/2009 | Shimura et al. | 49/349 |
| 2003/0009948 A1 | 1/2003 | Nishikawa et al. | |
| 2004/0003544 A1 * | 1/2004 | Berry et al. | 49/374 |
| 2004/0107644 A1 | 6/2004 | Ishii et al. | |
| 2004/0134130 A1 * | 7/2004 | Dobson et al. | 49/352 |
| 2004/0154227 A1 * | 8/2004 | Yoshimura | 49/352 |
| 2005/0081448 A1 | 4/2005 | Ishii et al. | |
| 2007/0144073 A1 * | 6/2007 | Munezane | E05F 11/483 49/349 |
| 2012/0117883 A1 | 5/2012 | Matsushita | |
| 2013/0227889 A1 * | 9/2013 | Matsushita | E05F 11/483 49/352 |

FOREIGN PATENT DOCUMENTS

| | | |
|---|---|---|
| JP | 2003-025838 A | 1/2003 |
| JP | 2009-114656 A | 5/2009 |
| JP | 2011-026858 A | 2/2011 |

OTHER PUBLICATIONS

International Search Report in PCT/JP2012/083674 dated Mar. 12, 2013.

* cited by examiner

VEHICLE WINDOW REGULATOR, AND VEHICLE DOOR STRUCTURE COMPRISING THE VEHICLE WINDOW REGULATOR

CROSS-REFERENCE TO RELATED APPLICATIONS

This U.S. National stage application claims priority under 35 U.S.C. §119(a) to Japanese Patent Application No. 2011-284402, filed in Japan on Dec. 26, 2011, and to Japanese Patent Application No. 2012-126414, filed in Japan on Jun. 1, 2012, the entire contents of Japanese Patent Application Nos. 2011-284402 and 2012-126414 are hereby incorporated herein by reference.

BACKGROUND

Field of the Invention

The present invention relates to a vehicle window regulator, which raises and lowers a windowglass of a vehicle, and a vehicle door structure that comprises the vehicle window regulator.

Background Information

In the conventional art, a window regulator is known that, in order to support a windowglass, connects two fixed carrier plates, which are spaced apart by a spacing in the vehicle front-rear directions, to a lower end of the windowglass, such that the windowglass is supported from both sides or in the vicinity of its center, and raises and lowers the windowglass (e.g., Japanese Unexamined Patent Application Publication No. 2009-114656).

Consequently, in the window regulator of Japanese Unexamined Patent Application Publication No. 2009-114656, a drive unit (i.e., a motor) that raises and lowers the windowglass must be disposed in the vicinity of the center of a door panel. As a result, the arrangement of a door pocket, a speaker, and the like is limited, and it is difficult to significantly change the layout of the door.

SUMMARY

Accordingly, it is conceivable to raise and lower the windowglass by disposing the carrier plates at the lower part on one side of the windowglass. Thereby, the drive unit can be located close to the one side.

However, if the carrier plates are disposed at the lower part on one side of the windowglass, then, when the windowglass is being lowered, the windowglass will adversely rotate, the vehicle width directions being the axis of rotation. As a result, a large amount of friction will occur between the windowglass and the sashes.

An object of the present invention is to provide a window regulator and a door structure whose layouts are flexible and that, when the windowglass is being raised or lowered, can prevent the rotation of the windowglass, the vehicle width directions being the axis of rotation.

To achieve the abovementioned objects, a window regulator according to the present invention is a window regulator for raising and lowering a windowglass that is slidably guided by a sash, and comprises a carrier plate, a drive unit, a raising cable, a lowering cable, and a guide rail. The carrier plate is attached to a lower part of the windowglass on a first edge part side, the first edge part being guided by the sash. The drive unit is capable of raising and lowering the windowglass via the carrier plate. In the raising cable, one end of the raising cable is coupled to the carrier plate, the raising cable transits a redirecting member, and an other end of the raising cable is coupled to the drive unit. In the lowering cable, one end of the lowering cable is coupled to the carrier plate, and an other end of the lowering cable is coupled to the drive unit. The guide rail mates with the carrier plate so as to guide the carrier plate and constrain the operation of the windowglass to the directions that intersect movement directions of the carrier plate.

(1) In the window regulator of the present invention, the carrier plate is provided to the lower part of the windowglass on the first edge part side, and the raising cable and the lowering cable are disposed between the carrier plate and the drive unit. In addition, the carrier plate is guided in the movement direction by the guide rail, and therefore the mechanism for raising and lowering the windowglass does not have to be disposed in the vicinity of the center of a door panel. In addition, the guide rail constrains the operation of the windowglass to the directions that intersect the movement directions of the carrier plate, which makes it possible to provide a window regulator that prevents, during the raising and lowering of the windowglass, the rotation of the windowglass, with the vehicle width directions serving as the axis of rotation, and that has a flexible layout. In addition, weight can also be reduced because the module panel for attaching the window regulator can also eliminated.

(2) The windowglass is guided by a first sash, which is disposed on the first edge part side, and a second sash, which is disposed on the side opposite to the first sash with respect to the windowglass. The window regulator may further comprise: a second carrier plate, which is attached to the lower part of the windowglass on the second sash side. The synchronization cable, one end of which is coupled to the second carrier plate and an other end of which is coupled to the first carrier plate, raises and lowers the second carrier plate synchronized to the first carrier plate.

In this case, the first carrier plate and the second carrier plate are coupled by the synchronization cable, and therefore are raised and lowered in a synchronized manner. Consequently, the windowglass can be raised and lowered by two carrier plates, namely, the first carrier plate and the second carrier plate. Thereby, it becomes even more difficult for the windowglass to rotate on the first sash side, and it becomes difficult for the windowglass to tilt, even on the second sash side.

(3) The drive unit may be attached to a bracket, which is provided between an upper end and a lower end of the guide rail.

In this case, the drive unit is attached to the bracket provided to the guide rail, which makes it possible to attach the drive unit to the vehicle body simply.

(4) A vehicle door structure may comprise: a door panel; a windowglass; sashes, which slidably guide edge parts of the windowglass in the vehicle front-rear directions; and the abovementioned vehicle window regulator.

In this case, all of the abovementioned operational effects can be obtained.

(5) The sashes comprise a sash on the side opposite to the center pillar, which is disposed on the side opposite to the center pillar of the vehicle. The carrier plate (i.e., the first carrier plate) may be connected to the edge part, in the vicinity of a lower end of the edge part, of the windowglass on the side opposite to the center pillar. The windowglass is supported by the carrier plate (i.e., the first carrier plate) and the sash on the side opposite to the center pillar.

In this case, the windowglass is supported by the sash on the side opposite to the center pillar and the carrier plate, which makes it possible to prevent the windowglass from rotating toward the side opposite to the center pillar.

(6) The sashes comprise a center pillar side sash, which is disposed on the center pillar side of the vehicle. The vehicle door structure may further comprise a friction reducing mechanism. The friction reducing mechanism is disposed between the edge part of the windowglass on the center pillar side sash side and the center pillar side sash and reduces friction between the windowglass and the center pillar side sash.

In this case, even though the windowglass is supported by the carrier plate and the sash on the side opposite to the center pillar, friction between the windowglass and the center pillar side sash is reduced by the friction reducing mechanism, and therefore the windowglass slides more easily against the center pillar side sash.

(7) The friction reducing mechanism may comprise a roller mechanism, a slider mechanism, or a coating layer for reducing friction that, during an operation when the windowglass is raised in order to be closed, reduces friction when an upper part of the edge part of the windowglass on the center pillar side sash side is pressed and slid against the center pillar side sash side owing to the tilting of the windowglass.

In this case, when the windowglass is raised in order to be closed, the windowglass tilts such that it drops down, and the upper part of the windowglass presses strongly against the center pillar side sash; however, at this time, the sliding noise is reduced by the roller mechanism or the slider mechanism.

BRIEF DESCRIPTION OF THE DRAWINGS

FIGS. 10(a) and 10(b) are schematic drawings of a friction reducing mechanism according to the fourth embodiment of the present invention, wherein FIG. 10(a) shows the case of the windowglass in the lower position and FIG. 10(b) shows the case wherein the windowglass has moved to the upper position;

FIGS. 11(a) and 11(b) are schematic drawings of the friction reducing mechanism according to a fifth embodiment of the present invention, wherein FIG. 11(a) shows the case of the windowglass in the lower position and FIG. 10(b) shows the case wherein the windowglass has moved to the upper position;

FIGS. 13(a) and 13(b) are schematic drawings of the friction reducing mechanism according to a sixth embodiment of the present invention, wherein FIG. 13(a) shows the case of the windowglass in the lower position and FIG. 11(b) shows the case wherein the windowglass has moved to the upper position.

DETAILED DESCRIPTION OF EMBODIMENTS

First Embodiment (1) Door Structure

A door structure explained in the present embodiment is applicable to both a front door structure and a rear door structure. The first embodiment below explains a front door structure.

Figure 1:
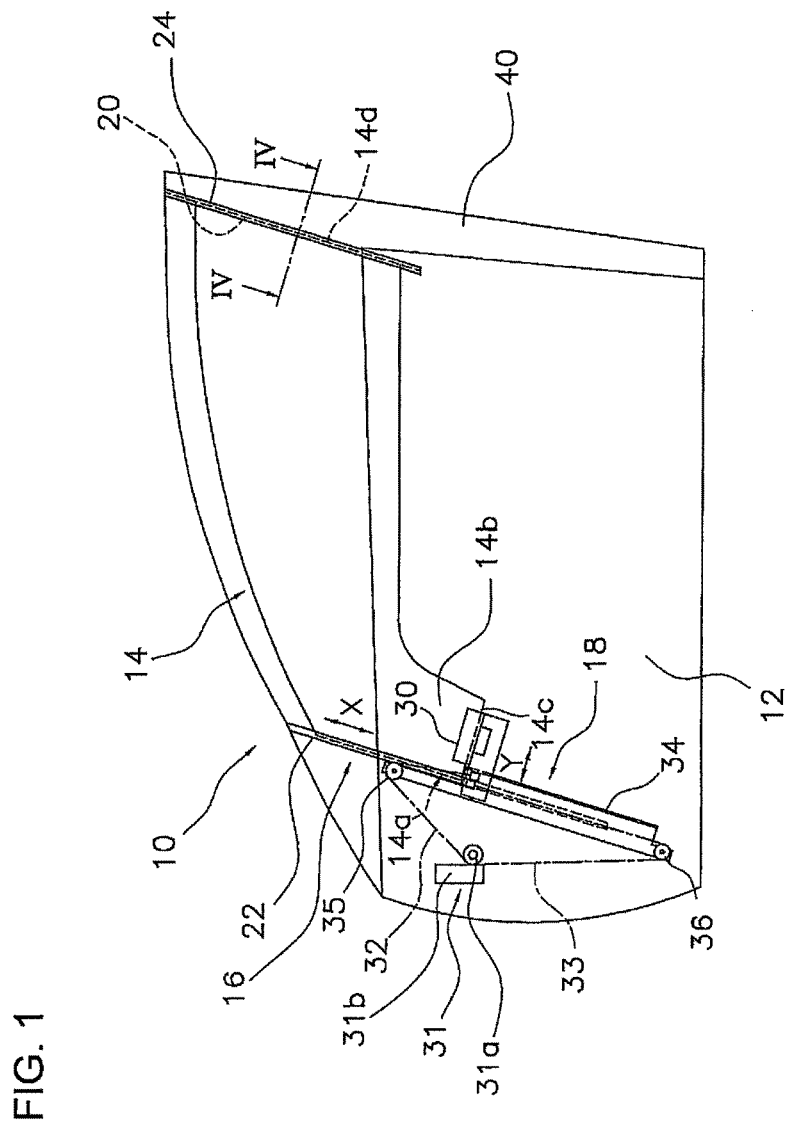
FIG. 1 is a side schematic drawing that shows a door structure according to a first embodiment of the present invention.
Figure 4:
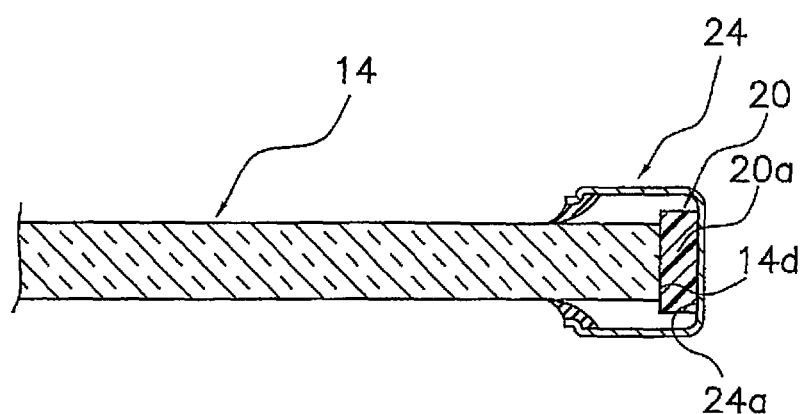
FIG. 4 is a cross sectional view taken along the IV-IV line in FIG. 1 of a sash in a center pillar side.

In FIG. 1, a vehicle door structure 10 comprises: a door panel 12; a windowglass 14; sashes 16, which slidably guide the windowglass 14; a window regulator 18, which is for raising and lowering the windowglass 14; and a friction reducing mechanism 20 (refer to FIG. 4).

The door panel 12 is for a front door and has a structure wherein the door panel 12 opens on a center pillar 40 side, the center pillar 40 being provided to a frame (not shown) of the vehicle. Edge parts of the windowglass 14 in the vehicle front-rear directions are slidably guided by the sashes 16 in movement directions X. The windowglass 14 comprises a first mount part 14b, which is for mounting the window regulator 18. The first mount part 14b is formed such that it extends downward from a lower side portion of a first edge part 14a of the windowglass 14 on the side opposite to the center pillar 40. The sashes 16 comprise a first sash 22 and a second sash 24. The first sash 22 is one example of a sash that is disposed on the side opposite to the center pillar. The second sash 24 is one example of a sash that is disposed on the center pillar side of the vehicle. Specifically, the first sash 22 and the second sash 24 each have a rectangular C shape in a cross sectional view. In addition, the first sash 22 is mounted to the first edge part 14a side of the windowglass 14. The second sash 24 is mounted to the side of the windowglass 14 opposite to the first sash 22.

(2) Window Regulator

The window regulator 18 is one example of a window regulator for raising and lowering a windowglass that is slidably guided by sashes. The window regulator 18 comprises a carrier plate 30 (i.e., a first carrier plate), a drive unit 31, a raising cable 32, a lowering cable 33, a guide rail 34, a first redirecting member 35, and a second redirecting member 36.

(2-1) Carrier Plate

Figure 2:
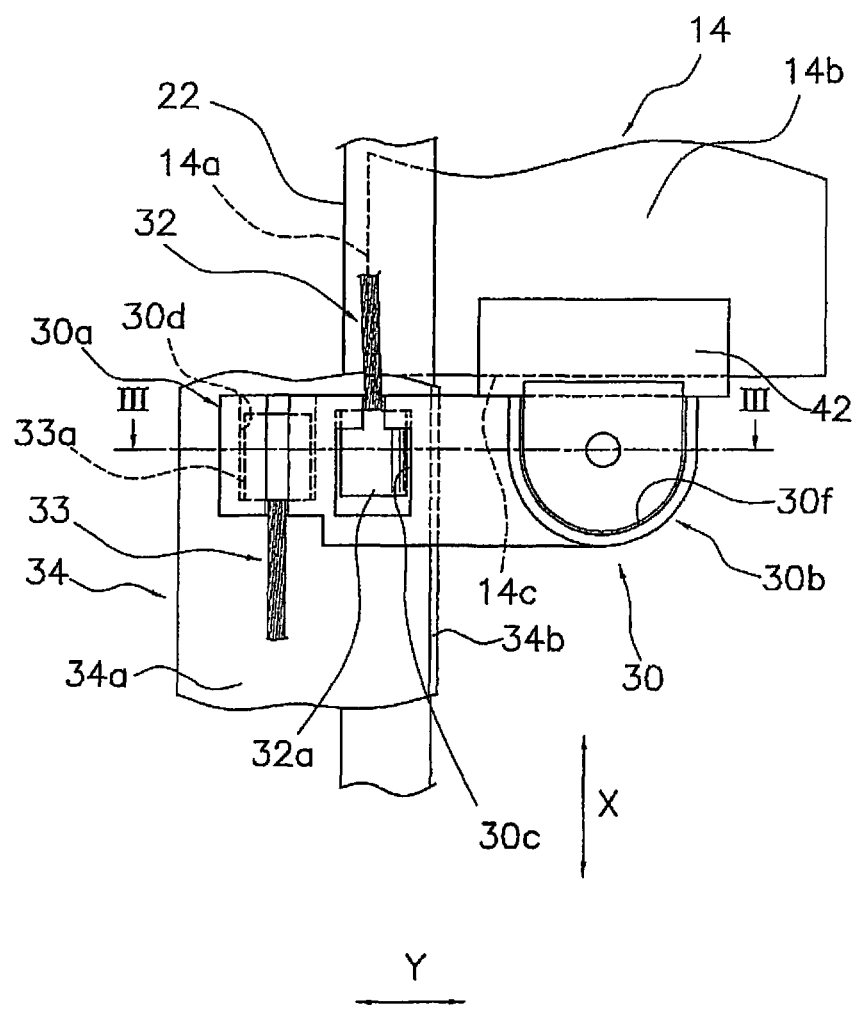
FIG. 2 is a side view of a carrier plate (i.e., a first carrier plate)
Figure 3:
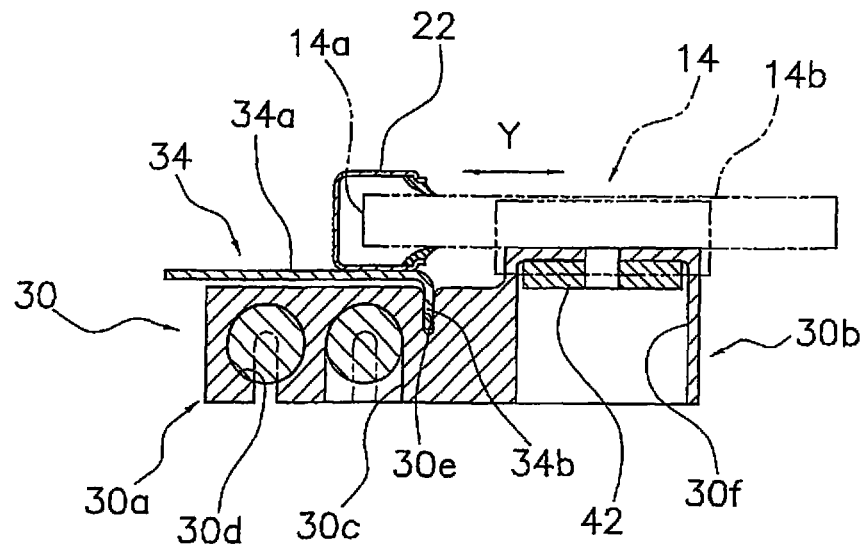
FIG. 3 is a cross sectional view taken along the line in FIG. 2 of the carrier plate (i.e., the first carrier plate)

The carrier plate 30 is one example of a carrier plate that is mounted to a windowglass. The carrier plate 30 is mounted to a lower part 14c of the windowglass 14 on the first edge part 14a side of the windowglass 14, the first edge part 14a being guided by the first sash 22 and first edge part 14a side being one of the vehicle front-rear directions. As shown in FIG. 2 and FIG. 3, the carrier plate 30 comprises a plate shaped plate main body 30a and a glass mount part 30b, which is provided integrally with an end part of the plate main body 30a. The plate main body 30a is a member that is made of, for example, metal or synthetic resin. A first cable coupling part 30c, whereto one end of the raising cable 32 is coupled, and a second cable coupling part 30d, whereto one end of the lowering cable 33 is coupled, are formed in the plate main body 30a. In addition, a guide groove 30e, which is guided by the guide rail 34, is formed along the movement directions X in the plate main body 30a. The guide groove 30e mates with the guide rail 34 such that the operation of the windowglass 14 is restricted to the directions Y, which intersect the movement directions X of the carrier plate 30. The glass mount part 30b has a mount recessed part 30f, whereto a mount bracket 42 fixed to the windowglass 14 can be mounted. The mount bracket 42 is fixed to the mount recessed part 30f by a fixing means such as a screw.

As discussed above, the sashes (e.g., the sashes 16) include the sash on the side opposite to the center pillar (e.g., the first sash 22) disposed on the side opposite to the center pillar (e.g., the center pillar 40) of the vehicle. The carrier plate (e.g., the carrier plate 30) is connected to the vicinity of a lower end of the edge part (e.g., the first edge part 14a) on the side opposite to the center pillar of the windowglass (e.g., the windowglass 14). In this case, the windowglass is supported by the sash on the side opposite to the center pillar and the carrier plate, and therefore the support structure of the windowglass is simple.

(2-2) Drive Unit

The drive unit 31 is one example of a mechanism that is capable of raising and lowering a windowglass via a carrier plate. As shown in FIG. 1, the drive unit 31 is provided to the door panel 12. The drive unit 31 comprises: a drum 31a, whereto an other end of the raising cable 32 and an other end of the lowering cable 33 are coupled; and a drive unit 31b, which comprises a reduction gear and a motor and rotatably drives the drum 31a. The drive unit 31 raises the windowglass 14 by winding up the raising cable 32 onto the drum 31a and paying out the lowering cable 33 from the drum 31a. In addition, the windowglass 14 is lowered by paying out the raising cable 32 from the drum 31a and winding up the lowering cable 33 onto the drum 31a. Furthermore, the drive unit may be a manual operation unit that comprises a crank handle.

(2-3) Raising Cable and Lowering Cable

As shown in FIG. 2, the raising cable 32 and the lowering cable 33 are inner cables that are formed by the twisting of steel wires.

The raising cable 32 is one example of a raising cable wherein one end of the raising cable is coupled to a carrier plate, the raising cable transits a redirecting member, and an other end of the raising cable is coupled to the drive unit. The raising cable 32 comprises cable nipples 32a, which are barrel shaped cable ends, at both ends. The cable nipple 32a at one end of the raising cable 32 is anchored to the first cable coupling part 30c of the carrier plate 30. The cable nipple 32a at the other end of the raising cable 32 is anchored to the drum 31a (refer to FIG. 1). The raising cable 32 transits the first redirecting member 35 from the carrier plate 30 and is coupled to the drive unit 31.

The lowering cable 33 is one example of a lowering cable wherein one end of the lowering cable is coupled to a carrier plate and an other end of the lowering cable is coupled to the drive unit. It comprises barrel shaped cable nipples 33a at both ends. The cable nipple 33a at one end of the lowering cable 33 is anchored to the second cable coupling part 30d of the carrier plate 30. The cable nipple 33a at the other end is anchored to the drum 31a (refer to FIG. 1). The lowering cable 33 transits the second redirecting member 36 from the carrier plate 30 and is coupled to the drive unit 31.

(2-4) Guide Rail

The guide rail 34 is one example of a guide rail that mates with a carrier plate such that the carrier plate is guided and such that the operation of the windowglass is constrained to the directions that intersect the movement directions of the carrier plate. The guide rail 34 is a plate shaped member that is made of synthetic resin or metal.

The guide rail 34 is disposed along the movement directions X of the windowglass 14. As shown in FIG. 2 and FIG. 3, the guide rail 34 comprises: a rail mount part 34a, which is attached to the door panel 12; and a guide part 34b, which is bent from the rail mount part 34a. In the present embodiment, the guide part 34b is bent at substantially a right angle from the rail mount part 34a. The guide part 34b mates with the guide groove 30e of the carrier plate 30. The thickness of the guide part 34b is slightly thinner than the width of the guide groove 30e. This mating structure makes it possible to constrain the operation of the carrier plate 30 to the directions that intersect the movement directions when the carrier plate 30 moves along the guide part 34b.

Furthermore, the guide part 34b of the guide rail 34 may be bent from the rail mount part 34a at an obtuse angle or an acute angle.

(2-5) First Redirecting Member and Second Redirecting Member

The first redirecting member 35 is rotatably mounted to an upper end of the guide rail 34. For example, a pulley is used as the first redirecting member 35. The second redirecting member 36 is rotatably mounted to the lower end of the guide rail 34. For example, a pulley is used as the second redirecting member 36. Furthermore, a configuration may be adopted wherein a drive part is provided to the lower end of the guide rail and the second redirecting member is not used. In addition, instead of a pulley, a semicircular member may be used as the second redirecting member.

(3) Friction Reducing Mechanism

The friction reducing mechanism 20 is one example of a friction reducing mechanism that reduces the friction between a windowglass and a second sash, which is the center pillar side sash. As shown in FIG. 4, the friction reducing mechanism 20 is disposed between a second edge part 14d, which is on the second sash 24 side of the windowglass 14, and inner side surfaces of the second sash 24. The friction reducing mechanism 20 comprises a plate shaped or sheet shaped friction reducing member 20a, which is for reducing friction and is made of a synthetic resin having high sliding performance, for example, a fluororesin containing tetrafluororesin, a polyacetal such as POM, and the like. The friction reducing member 20a is fixed to a bottom part 24a of the second sash 24 by an appropriate fixing means such as bonding.

As mentioned above, the friction reducing mechanism (e.g., the friction reducing mechanism 20) is disposed between the edge part (e.g., the second edge part 14d) on the center pillar side sash (e.g., the second sash 24) side of the windowglass (e.g., the windowglass 14) and the center pillar side sash, and reduces the friction between the windowglass and the center pillar side sash. In this case, even though the windowglass is supported by the carrier plate and the sash on the side opposite to the center pillar, the friction between the windowglass and the center pillar side sash is reduced by the friction reducing mechanism. As a result, the windowglass is smoothly guided by the center pillar side sash.

Furthermore, in the abovementioned example, the friction reducing mechanism is provided on the sash side, but the friction reducing mechanism is not particularly limited thereto as long as it reduces the friction arising due to the sliding of the glass and may be provided to the sash or to the glass. For example, the friction reducing mechanism may be configured by at least one rolling body such as a roller. In this case, it is preferable to provide a plurality of the rolling bodies spaced apart along the longitudinal directions of the second sash such that they contact the second edge part of the glass.

(4) Operation of First Embodiment

Figure 5:
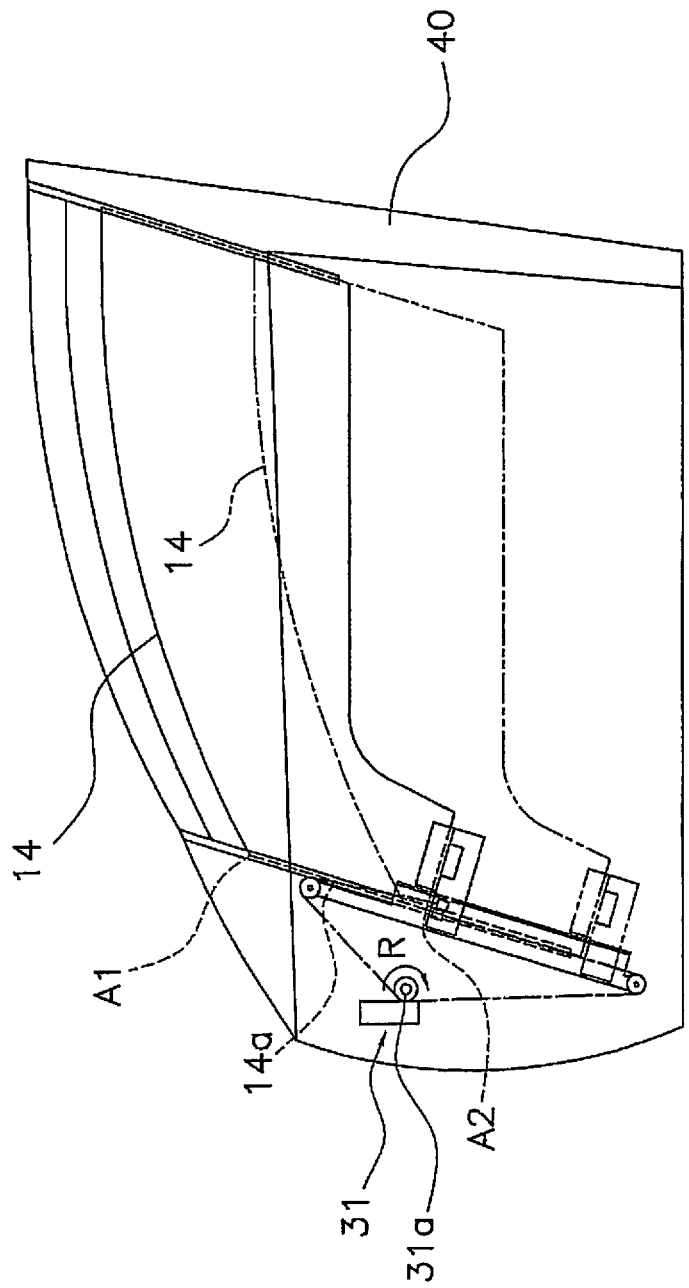
FIG. 5 is a side schematic drawing that shows the operation of the door structure.

As shown in FIG. 5, in the door structure 10, when a lowering switch (not shown) provided to the door panel and the like is operated, the drum 31a of the drive unit 31 rotates in the lowering direction (e.g., clockwise in FIG. 5) indicated by an arrow R. Thereby, the lowering cable 33 is wound up onto the drum 31a and the raising cable 32 is paid out from the drum 31a, and thereby the windowglass 14 lowers to a lowering position, which is indicated in FIG. 5 by a chain double dashed line. At this time, if a lower end position of the first edge part 14a of the windowglass 14, namely, a point A2, is not constrained to the directions that intersect the movement directions of the windowglass 14 midway during the lowering indicated by the solid line, then there is a risk that the windowglass 14 will rotate, with an upper end position A1 of the first edge part 14a serving as a fulcrum, counterclockwise, with the vehicle width directions serving as an axis. However, in the present embodiment, the guide groove 30e of the carrier plate 30 is mated to the guide part 34b of the guide rail 34, and thereby operation such as rotation or movement in the directions that intersect the movement directions of the carrier plate 30 is constrained. Consequently, the windowglass 14 is guided without rotating.

Moreover, when the friction reducing mechanism 20 is provided, friction between the second edge part 14d of the windowglass 14 and the second sash 24 is reduced, and therefore the windowglass 14 is more smoothly guided.

As mentioned above, in the window regulator (e.g., the window regulator 18), the carrier plate (i.e., the carrier plate 30) is provided to the lower part (e.g., the lower part 14c) on the first edge part (e.g., the first edge part 14a) side of the windowglass (e.g., the windowglass 14). The raising cable (e.g., the raising cable 32) and the lowering cable (e.g., the lowering cable 33) are disposed between the carrier plate and the drive unit (e.g., the drive unit 31). Thereby, the drive unit and the carrier plate can be disposed on one side of the windowglass. In addition, the carrier plate, which is connected to the lower part (e.g., the lower part 14c) on the first edge part (e.g., the first edge part 14a) side by the guide rail (e.g., the guide rail 34), is guided in the movement directions, and therefore it is unnecessary to provide the guide rail in the vicinity of the center of the door panel, and the mechanism for raising and lowering the windowglass does not have to be disposed in the vicinity of the center of the door panel. In addition, operation of the windowglass in the directions that intersect the movement directions of the carrier plate is constrained by the guide rail, and thereby the windowglass lowers along the first sash, which makes it possible both to prevent the rotation of the windowglass, with the vehicle width directions serving as the axis, when the windowglass is raised or lowered and to provide a window regulator with a flexible layout.

Furthermore, the size of the inner panel for attaching the window regulator 18 of the door panel can be reduced, which reduces the weight of the door panel.

Furthermore, in the case of a rear door structure, the drive unit and the carrier plate are connected in the vicinity of the lower end of the edge part on the side opposite to the center pillar of the windowglass.

Second Embodiment

A second embodiment of the present invention will now be explained, referencing FIG. 6 and FIG. 7. Furthermore, in the following explanation, constituent members and constituent parts that are the same as those in the first embodiment are assigned the same symbols as in the first embodiment, and specific explanations thereof are therefore omitted.

(5) Door Structure

Figure 6:
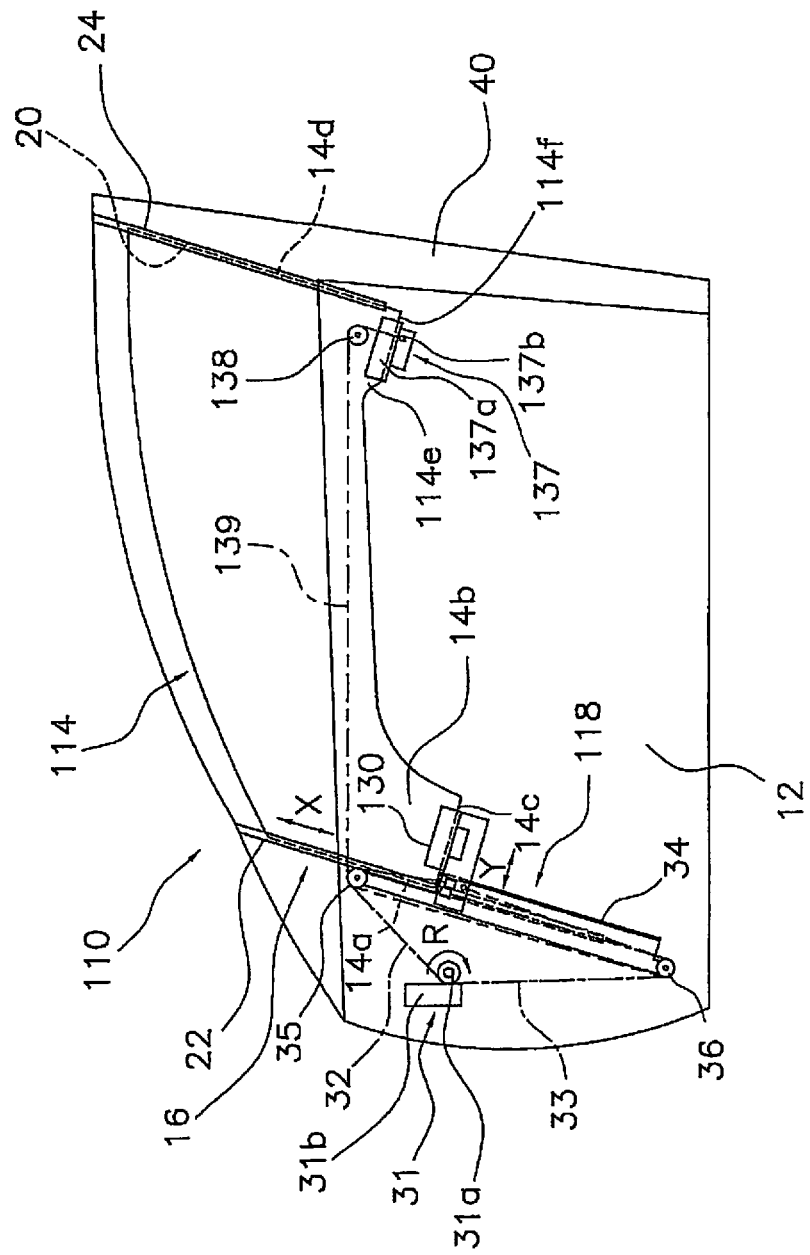
FIG. 6 corresponds to FIG. 1 and shows the door structure according to a second embodiment of the present invention.

As shown in FIG. 6, a door structure 110 according to the second embodiment comprises: the door panel 12; a windowglass 114; the sashes 16, which slidably guide the windowglass 114; a window regulator 118, which is for raising and lowering the windowglass 114; the first redirecting member 35; the second redirecting member 36; and a third redirecting member 138.

The windowglass 114 is one example of a windowglass that is guided by a first sash, which is disposed on a first edge part side, and a second sash, which is disposed on the side opposite to the first sash. The windowglass 114 comprises: the first mount part 14b, which is provided to the first edge part 14a, which is on the side opposite to the center pillar 40; and a second mount part 114e, which is formed such that it extends downward from the lower side portion of the second edge part 14d on the center pillar 40 side.

(6) Window Regulator

The window regulator 118 comprises a carrier plate 130, a second carrier plate 137, the drive unit 31, the raising cable 32, the lowering cable 33, the guide rail 34, and a synchronization cable 139.

(6-1) Carrier Plate

Figure 7:
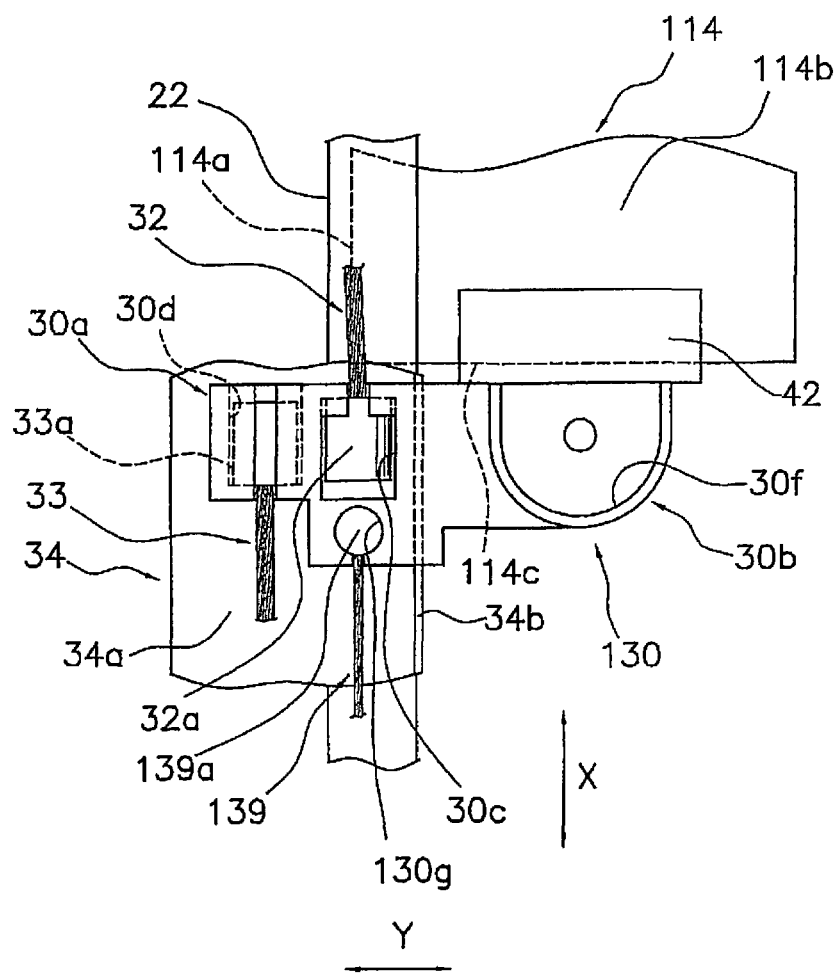
FIG. 7 corresponds to FIG. 2 and shows the carrier plate (i.e., the first carrier plate) according to the second embodiment of the present invention.

As shown in FIG. 7, the carrier plate 130 has generally the same configuration as the carrier plate 30, excepting a third cable coupling part 130g that couples with the synchronization cable 139 of the first embodiment. The third cable coupling part 130g is disposed below the first cable coupling part 30c.

(6-2) Synchronization Cable

The synchronization cable 139 is one example of a synchronization cable wherein one end is coupled to a second carrier plate, an other end is coupled to a carrier plate, and the second carrier plate is raised and lowered synchronized with the carrier plate. The synchronization cable 139 is an inner cable that comprises drum shaped cable nipples 139a at both ends. The cable nipple 139a provided at one end of the synchronization cable 139 is anchored to the second carrier plate 137. The cable nipple 139a provided at an other end of the synchronization cable 139 is anchored to the third cable coupling part 130g of the carrier plate 130. As shown in FIG. 6, the synchronization cable 139 transits from the second carrier plate 137 to the third redirecting member 138, the first redirecting member 35, and the second redirecting member 36, and is coupled to the carrier plate 130.

(6-3) Second Carrier Plate

The second carrier plate 137 is one example of a carrier plate that is attached to the windowglass. As shown in FIG.

6, the second carrier plate 137 is attached to a lower part 114*f* of the second mount part 114*e* on the second edge part 14*d* side of the windowglass 114. The second carrier plate 137 comprises a glass mount part 137*a* and a cable coupling part 137*b*.

(6-4) Third Redirecting Member

The third redirecting member 138 is rotatably mounted to the center pillar side of the door panel 12. For example, a pulley is used as the third redirecting member 138.

(7) Operation of Second Embodiment

In the door structure 110, when the lowering switch (not shown) provided to the door panel and the like is operated, the drum 31*a* of the drive unit 31 rotates in the lowering direction (e.g., clockwise in FIG. 6) indicated by the arrow R. Thereby, the lowering cable 33 is wound up onto the drum 31*a* and the raising cable 32 is paid out from the drum 31*a*, and thereby the windowglass 14 lowers toward the lowering position indicated by the chain double dashed line in FIG. 5. At this time, one end of the synchronization cable 139 lowers in accordance with the lowering of the carrier plate 130, and thereby the second carrier plate 137 lowers synchronized to the carrier plate 130.

In addition, when the raising switch is operated, the drum 31*a* of the drive unit 31 rotates in a raising direction (e.g., counterclockwise in FIG. 6), which is the reverse direction of the arrow R. Thereby, the raising cable 32 is wound up onto the drum 31*a* and the lowering cable 33 is paid out from the drum 31*a*, and thereby the windowglass 114 rises. At this time, the one end of the synchronization cable 139 rises in accordance with the rising of the carrier plate 130, and the second carrier plate 137 rises synchronized to the carrier plate 130.

As mentioned above, the windowglass (e.g., the windowglass 114) is guided by: the first sash (e.g., the first sash 22), which is disposed on the first edge part (e.g., the first edge part 14*a*) side; and the second sash (e.g., the second sash 24), which is disposed on the side opposite to the first sash with respect to the windowglass. The window regulator (e.g., the window regulator 118) comprises the second carrier plate (e.g., the second carrier plate 137) and the synchronization cable (e.g., the synchronization cable 139). The second carrier plate is attached to the lower part (e.g., the lower part 1140 on the second sash side of the windowglass. One end of the synchronization cable is coupled to the second carrier plate, and the other end is coupled to the carrier plate, and the synchronization cable raises and lowers the second carrier plate synchronized to the carrier plate.

Thereby, it is more difficult for the windowglass to rotate on the first sash side, it is more difficult for the windowglass to tilt on the second sash side, and the windowglass also slides more easily. In addition, the synchronization cable is not a drive unit and is coupled to the carrier plate; therefore, even though the second carrier plate is provided, a large space can be formed in the vicinity of the center of the door panel, which makes it possible to provide a window regulator with a flexible layout.

Third Embodiment

Figure 8:
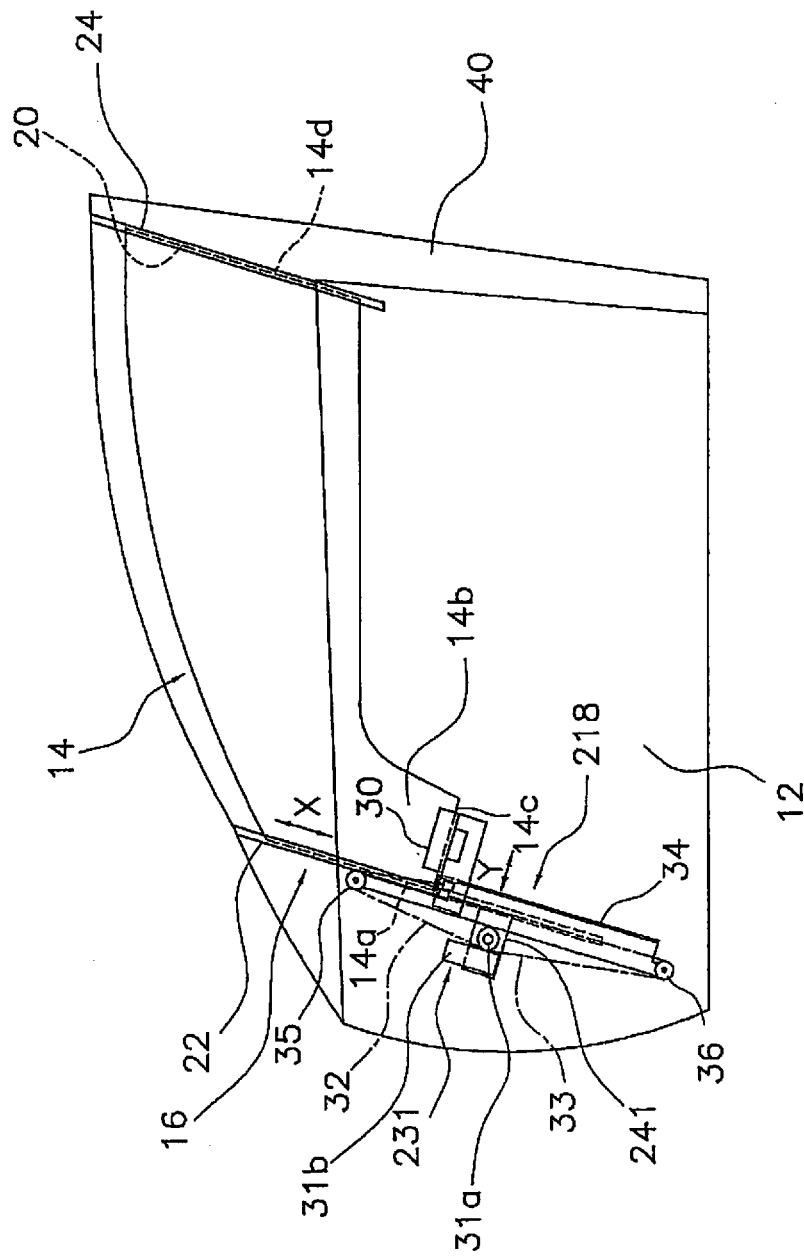
FIG. 8 corresponds to FIG. 1 and shows the door structure according to a third embodiment of the present invention.

In a third embodiment, as shown in FIG. 8, the mounting mode of a drive unit 231 of a window regulator 218 differs from that of the first embodiment and that of the second embodiment. Other aspects of the configuration are the same as those of the first embodiment, and explanations thereof are therefore omitted.

(8) Drive Unit

The drive unit 231 is provided to a bracket 241, which is provided between an upper end and a lower end of the guide rail 34. The drive unit 231 comprises: the drum 31*a*, whereto the other end of the raising cable 32 and the other end of the lowering cable 33 are coupled; and the drive unit 31*b*, which comprises the reduction gear and the motor and rotatably drives the drum 31*a*.

As mentioned above, the drive unit (e.g., the drive unit 231) is attached to the bracket (e.g., the bracket 241) provided between the upper end and the lower end of the guide rail (e.g., the guide rail 34). Accordingly, the assembly cost can be reduced by virtue of the attachment of the drive unit to the door panel and the attachment of the guide rail being performed simultaneously.

(9) Fourth Through Sixth Embodiments

Other embodiments, namely, fourth through sixth embodiments, of the friction reducing mechanism are explained below. The friction reducing mechanism reduces friction between the windowglass and the sash on the side opposite to the drive unit.

As discussed in the first through third embodiments, the friction reducing mechanism solves the problem of how to smoothly guide the windowglass with the sash on the side opposite to the drive unit, and more particularly, when the windowglass is raised in order to be closed, also has the effect of reducing sliding noise at the location where the windowglass tilts and an upper part of the windowglass is pressed strongly against the sash. Such an effect is obtained in the invention of the present application by paying particular attention to the phenomenon wherein, when the windowglass is raised or lowered, and particularly when the windowglass is being raised in order to close it, sliding noise arises when the windowglass tilts such that it drops down and slides against the sash.

Fourth Embodiment

The friction reducing mechanism of the fourth embodiment will now be explained, referencing FIG. 9 and FIG. 10.

Figure 9:
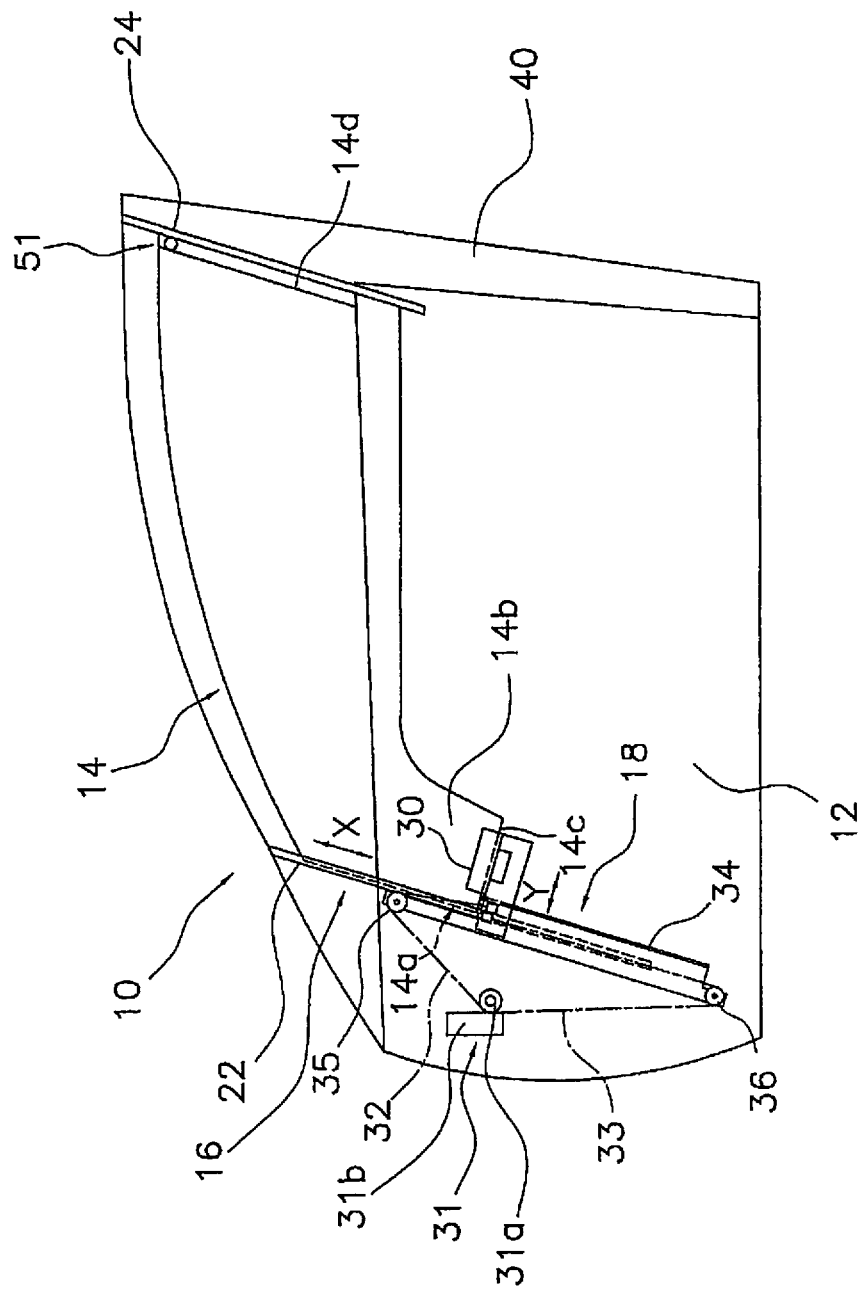
FIG. 9 corresponds to FIG. 1 and shows the door structure according to a fourth embodiment of the present invention.

As shown in FIG. 9, a friction reducing mechanism 51 is disposed between the second edge part 14*d* on the second sash 24 side of the windowglass 14 and the inner side surface of the second sash 24.

As shown in FIGS. 10(*a*) and 10(*b*), the friction reducing mechanism 51 is a roller mechanism that is provided to an upper end of the second edge part 14*d* of the windowglass 14. The friction reducing mechanism 51 comprises a roller 53, which is disposed in the vicinity of the second edge part 14*d* of the windowglass 14, and a bracket 55, which is fixed to the second edge part 14*d* of the windowglass 14. The roller 53 is rotatably supported by the bracket 55. Part of the roller 53 protrudes from the second edge part 14*d* toward the outer side.

Figures 10A, 10B:
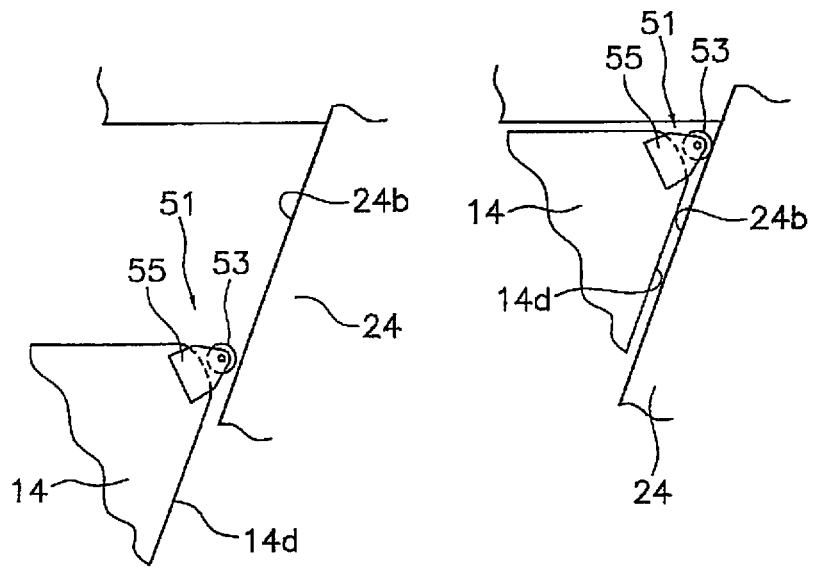

As shown in FIG. 10(*a*), in the window open state wherein the windowglass 14 is disposed in the lower position, the roller 53 is disposed at a position at which a slight gap is created with respect to the inner side surface of the second sash 24. When the windowglass 14 rises from this state, the carrier plate 30 is disposed at the lower part 14*c* on one side of the windowglass 14, and therefore, when the windowglass 14 rises, the windowglass 14 adversely rotates, with the vehicle width directions serving as the axis of rotation. As a result, the windowglass 14 tilts such that it drops down on the second sash 24 side; as a result, as shown in FIG. 10(b), the roller 53 makes contact with and rolls against an inner side surface upper part 24b of the second sash 24. Here, the rolling of the roller 53 reduces the frictional force that arises between the upper part of the windowglass 14 and the upper part of the second sash 24. As a result, the windowglass 14 is smoothly guided by the second sash 24, namely, the sliding noise is reduced when the windowglass 14 is raised in order to be closed.

Fifth Embodiment

The friction reducing mechanism according to the fifth embodiment will now be explained, referencing FIGS. 11(a), 11(b) and 12.

Figures 11A, 11B:
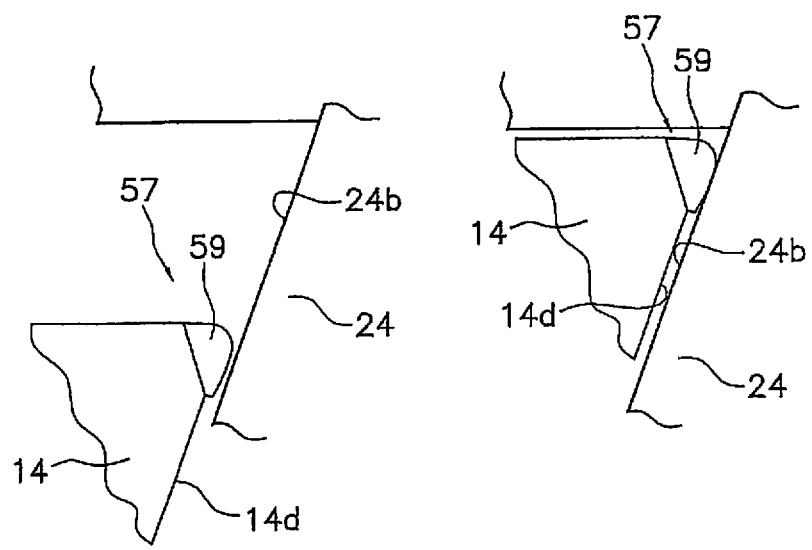

As shown in FIGS. 11(a) and 11(b), a friction reducing mechanism 57 is a slider mechanism that is provided to the upper end of the second edge part 14d of the windowglass 14. The friction reducing mechanism 57 comprises a slider member 59, which is disposed in the vicinity of the second edge part 14d of the windowglass 14. The slider member 59 is formed of a material that is made of a synthetic resin having high sliding performance, for example, a fluororesin containing tetrafluororesin, a polyacetal such as POM, and the like. Part of the slider member 59 protrudes from the second edge part 14d toward the outer side. The surface of the slider member 59 on the second sash 24 side is smoothly curved.

Figure 12:
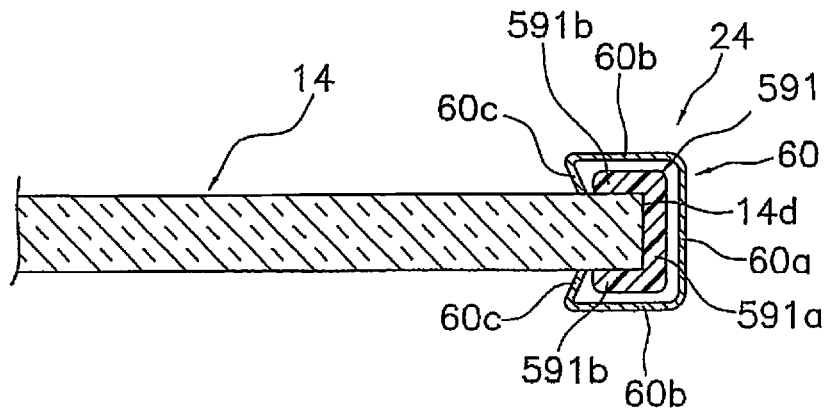
FIG. 12 is a cross sectional view of the center pillar side sash according to the fifth embodiment of the present invention.

As shown in FIG. 12, the second sash 24 may comprise a glass run 60, and the slider member of the slider mechanism may slide inside the glass run 60. The glass run 60 comprises: a first portion 60a, against which a slider member 591 slides; a pair of second portions 60b, which extend therefrom; and a pair of third portions 60c, which extend such that they bend from the tips thereof toward the inner side. As is clear from the drawing, the slider member 591 comprises a pair of second protruding parts 591b that protrude from the second edge part 14d of the windowglass 14 in the directions orthogonal to the glass plane. The pair of second protruding parts 591b corresponds to the pair of third portions 60c. Furthermore, the slider member 591 is not particularly limited thereto as long as it improves the sliding characteristics of the windowglass, and may be provided on only the upper side of the windowglass 14 or over all edge parts of the entire windowglass 14.

As shown in FIG. 11(a), in the window open state wherein the windowglass 14 is disposed in the lower position, the slider member 59 is disposed at the position at which a slight gap is created with respect to the inner side surface of the second sash 24. When the windowglass 14 rises from this state, the windowglass 14 tilts such that it drops down on the second sash 24 side, and as a result, the slider member 59 makes contact with and rolls against the inner side surface upper part 24b of the second sash 24. Here, the sliding of the slider member 59 reduces the frictional force that arises between the upper part of the windowglass 14 and the upper part of the second sash 24. As a result, the windowglass 14 is smoothly guided by the second sash 24, namely, the sliding noise is reduced when the windowglass 14 is raised in order to be closed. In addition, a protruding part 591a of the slider member 59 engages with the third portions 60c of the glass run 60, which prevents the second edge part 14d of the windowglass 14 from flying out of the glass run 60. In particular, the second protruding parts 591b of the slide member 591 prevents the windowglass 14 from tilting forward (i.e., prevents the first edge part 14a from dropping down from its original position and the second edge part 14d from rising upward from its original position).

Sixth Embodiment

The friction reducing mechanism according to the sixth embodiment will now be explained, referencing FIGS. 13(a) and 13(b).

Figures 13A, 13B:
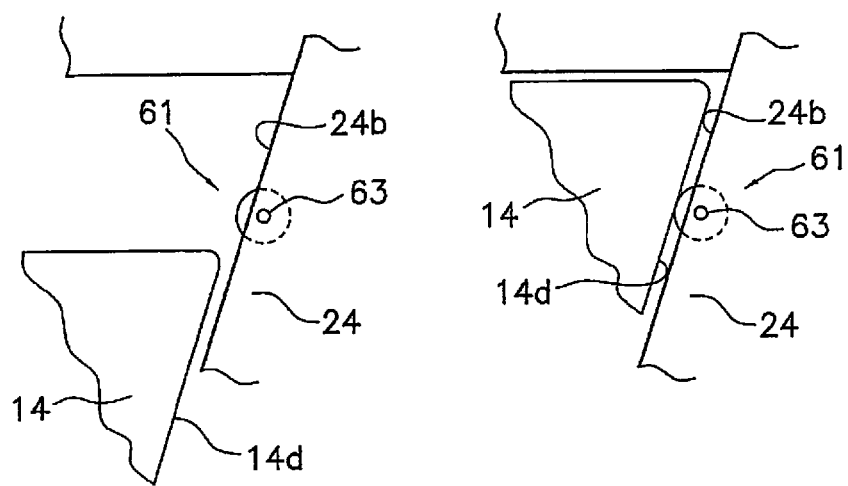

As shown in FIGS. 13(a) and 13(b), a friction reducing mechanism 61 is a roller mechanism that is provided in the vicinity of the lowest end of the inner side surface upper part 24b of the second sash 24. The friction reducing mechanism 61 comprises a roller 63, which is rotatably supported by the inner side surface upper part 24b of the second sash 24. The roller 63 is housed inside a recessed part that is formed in an inner side surface of the second sash 24, and a part of the roller 63 protrudes from the inner side surface of the second sash 24 toward the outer side.

As shown in FIG. 13(a), in the window open state wherein the windowglass 14 is disposed in the lower position, the second edge part 14d of the windowglass 14 is disposed at the position at which a slight gap is created with respect to the inner side surface of the second sash 24. When the windowglass 14 rises from this state, the windowglass 14 tilts such that it drops down on the second sash 24 side; as a result, as shown in FIG. 13(b), a state obtains wherein an upper side portion of the second edge part 14d of the windowglass 14 makes contact with and is received by the roller 63. Here, the rolling of the roller 63 reduces the frictional force that arises between the upper part of the windowglass 14 and the upper part of the second sash 24. As a result, the windowglass 14 is smoothly guided by the second sash 24, namely, the sliding noise is reduced when the windowglass 14 is raised in order to be closed. Furthermore, in the embodiment shown in FIGS. 13(a) and 13(b), one roller is provided, but a plurality of the rollers may be provided as long as the windowglass is not damaged when rising and the sliding noise can be reduced.

As discussed above, the friction reducing mechanism (e.g., the friction reducing mechanisms 51, 57, 61) comprises a roller mechanism (e.g., the friction reducing mechanisms 51, 61) or a slider mechanism (e.g., the friction reducing mechanism 57) in order to reduce the friction that arises when, during the operation wherein the windowglass (e.g., the windowglass 14, 114) is raised in order to be closed, the upper part of the edge part (e.g., the first edge part 14d) on the sash (e.g., the second sash 24) side, namely, on the side opposite to the drive unit, of the windowglass is pressed and slid against the sash (e.g., the second sash 24) side owing to the tilting of the windowglass.

In this case, when the windowglass is raised in order to be closed, if the windowglass tilts and the upper part of the windowglass is pressed strongly against the sash, then the sliding noise is reduced by the roller mechanism or the slider mechanism.

Furthermore, besides the abovementioned roller mechanism or slider mechanism, a coating layer can also be used as the friction reducing mechanism. Normally, the edge part of the windowglass 14 is not subject to a surface treatment such as a mirror surface treatment and is formed as a rough surface that has a rough surface feeling; consequently, when the windowglass is raised or lowered in the state wherein the rough surface parallel to the thickness directions of the windowglass and the sash (e.g., the second sash 24) are pressed against one another, a frictional force arises. Here, in the case wherein the coating layer is provided to the edge part of the windowglass, the slide surface on the windowglass side becomes the coating layer surface, and consequently the frictional force is reduced. The coating layer is not particularly limited as long as it can reduce the frictional force at the edge part of the windowglass, and may be provided to the upper part of the edge part of the windowglass or provided with a width of approximately 10 mm from the edge part of the windowglass to the inner side of the windowglass. In addition, the material with which the coating layer is formed is not particularly limited as long as the abovementioned objects can be achieved, and the frictional force may be further reduced by incorporating, for example, a fluororesin, a silicon based resin, or silica as a component. Furthermore, as one method of forming the coating layer, a normal coating method can be used to form a layer on the glass surface with a thickness sufficient to ensure that it does not easily peel off owing to the frictional force.

The abovementioned sliding noise reducing effect is remarkable in the case wherein, as shown in the first through third embodiments, the carrier plate (e.g., the carrier plates 30, 130) is disposed at the lower part on one side of the windowglass (e.g., the windowglass 14, 114) and, furthermore, the drive unit (e.g., the drive units 31, 231) is disposed such that it can raise and lower the windowglass via the carrier plate. This is because, in this case, when the windowglass is rising, the windowglass rotates, with the thickness directions (i.e., the vehicle width directions) of the windowglass serving as the axis of rotation, and, as a result, the edge part (e.g., the second edge part 14d) of the windowglass on the side opposite to the one side, which is the side on which the carrier plate (e.g., the carrier plates 30, 130) is provided, is strongly pressed against the vehicle body (i.e., in the present embodiment, the sash, e.g., the second sash 24), and the frictional force generated by this pressing force is reduced by the friction reducing mechanism. Furthermore, in such an apparatus configuration, it is of course also possible to use the configuration of the window regulator of the type described above wherein the drive unit uses the guide rail to raise and lower the carrier plate via the cable.

In addition, the abovementioned embodiments achieve excellent sliding noise reducing effects by providing the roller mechanism or the slider mechanism to the upper part (in the embodiments, the vicinity of the upper end part) of the windowglass or the sash. This is because the sliding in the state wherein the windowglass is strongly pressed by the sash causes a particularly strong force to be applied from the drive unit to the windowglass in the last stage when the windowglass is raised and closed.

Furthermore, the friction reducing mechanism may be provided to the windowglass or the sash, or both.

(10) Other Embodiments

The above explained embodiments of the present invention based on the drawings, but the specific constitution is not limited to these embodiments, and it is understood that variations and modifications may be effected without departing from the spirit and scope of the invention. In particular, the embodiments and modified examples recited in the present specification can be combined arbitrarily as needed.

The invention claimed is:

1. A vehicle door structure, comprising:
a door panel;
a windowglass;
a first sash disposed to slidably guide a first edge part side of the windowglass that is opposite to a center pillar of the vehicle; and
a vehicle window regulator configured to raise and lower the windowglass, the vehicle regulator comprising:
a carrier plate having a main body and a glass mount part, the glass mount part being provided at only one end of the main body in a direction that transversely intersects movement directions of the carrier plate, the glass mount part being attached to a lower part of the windowglass in a vicinity of a lower end of the first edge part side, the carrier plate having a guide groove, and the first edge part side being guided by the first sash such that the windowglass is supported by the carrier plate and the first sash on the first edge part side;
a drive unit configured to raise and lower the windowglass via the carrier plate;
a raising cable having one end coupled to the carrier plate, the raising cable transmitting a redirecting member, and the raising cable having an other end coupled to the drive unit;
a lowering cable having one end coupled to the carrier plate and an other end coupled to the drive unit; and
a single guide rail mounted to the door panel, the single guide rail having a guide portion which slidably engages with the guide groove of the carrier plate so as to guide the carrier plate and constrain the operation of the windowglass in directions that intersect the movement directions of the carrier plate without any other guide rail being mounted to the door panel, such that the windowglass is restricted by the single guide rail and the guide portion from moving in the directions that intersect the movement directions of the windowglass at the lower end of the first edge part side of the windowglass.

2. The vehicle door structure according to claim 1, further comprising
a second sash, which is disposed on a second edge part side of the windowglass opposite to the first edge part side of the windowglass to slidably guide the second edge part side; and
wherein the vehicle window regulator further comprises
a second carrier plate, which is attached to the lower part of the windowglass on the second edge part side; and
a synchronization cable having one end which is coupled to the second carrier plate and an other end which is coupled to the carrier plate, and the synchronization cable being configured to raise and lower the second carrier plate synchronized to the carrier plate.

3. The vehicle door structure according to claim 1, wherein
the drive unit is attached to a bracket, which is provided between an upper end and a lower end of the guide rail.

4. The vehicle door structure according to claim 1, further comprising
a friction reducing mechanism comprises a roller mechanism, a slider mechanism, or a coating layer that, during an operation when the windowglass is raised in order to be closed, reduces friction when an upper part of a second edge part side of the windowglass on a center pillar side sash side is pressed and slid against the center pillar side sash side due to the tilting of the windowglass.

5. The vehicle door structure according to claim 2, wherein
the drive unit is attached to a bracket, which is provided between an upper end and a lower end of the guide rail.

6. The vehicle door structure according to claim 1, wherein
   the carrier plate is disposed at the lower end of the lower part on the first edge part side of the windowglass such that the carrier plate rotates around an axis in a vehicle width direction relative to the windowglass when the windowglass rises, so that the windowglass tilts to drop down on a second sash.

7. The vehicle door structure according to claim 6, wherein
   the carrier plate rotates around the axis in the vehicle width direction relative to the windowglass when the windowglass rises, so that a second edge part side of the window glass, which is opposite to the first edge part side at which the carrier plate is disposed, is pressed against a body of the vehicle.

8. The vehicle door structure according to claim 1, further comprising
   a second sash which is disposed on a second edge part side of the windowglass which is opposite to the first edge part side of the windowglass and proximate to the center pillar of the vehicle; and
   wherein the vehicle door structure further comprises
   a friction reducing mechanism, which is disposed between the second edge part side of the windowglass and the second sash and is configured to reduce friction between the windowglass and the second sash.

9. The vehicle door structure according to claim 8, wherein
   the friction reducing mechanism is located at a position which creates a gap with respect to an inner side surface of the second sash in a windowglass open state in which the windowglass is disposed in a lower position.

10. The vehicle door structure according to claim 1, wherein
   the single guide rail is mounted to the door panel proximate to the first edge part side of the windowglass which is closer to a front of the vehicle than a second edge part side of the windowglass opposite to the first edge part side.

\* \* \* \* \*